United States Patent [19]
Kimble et al.

[11] Patent Number: 5,659,208
[45] Date of Patent: Aug. 19, 1997

[54] POWER SUPPLY WITH MULTIPLE ISOLATED REGULATORS AND ISOLATION MODE

[75] Inventors: Christopher J. Kimble, Pine Island; Patrick K. Egan, Rochester, both of Minn.

[73] Assignee: International Business Machines Corporation, Armonk, N.Y.

[21] Appl. No.: 503,075

[22] Filed: Jul. 14, 1995

[51] Int. Cl.[6] .................................................. H02M 7/21
[52] U.S. Cl. ..................... 307/82; 364/273.1; 364/273.2; 364/273.3; 364/273.4; 364/273.5; 364/492; 307/65; 307/146; 363/34; 363/65
[58] Field of Search ................................. 307/82, 43, 48, 307/146, 64, 65, 66; 363/34, 65; 364/492, 273.1, 273.2, 273.3, 273.4, 948.4, 948.5, 948.6, 948.7, 948.8, 948.91; 379/2

[56] References Cited

U.S. PATENT DOCUMENTS 4,948,997 8/1990 Ohmitsu et al. .
5,155,672 10/1992 Brown .
5,173,848 12/1992 Roof .

Primary Examiner—William M. Shoop, Jr.
Assistant Examiner—Albert W. Paladini
Attorney, Agent, or Firm—Felsman Bradley Gunter & Dillon

[57] ABSTRACT

A method of operating a redundant power supply is disclosed wherein two or more converters are separately connected to a common output node through separate diodes to isolate the converters and allow the outputs to be separately tested for diagnostic purposes. The diodes are selectively bypassed by connecting drain-to-source paths of P-channel MOS field-effect transistors separately across the diodes. During the diagnostic mode of operation, a controller shuts off the MOS transistors, so the diodes are effective in isolating the converters. During the bypass mode of operation, the transistors are turned on by the controller so the diodes are bypassed and their forward voltage drop does not appear in the circuit and so power dissipation is reduced. It is noted that the P-channel MOS transistor is connected such that it's intrinsic PN-junction diode conducts in a forward direction in parallel with the isolation diode, so that isolation during the diagnostic mode is not cancelled. The controller switches from the diagnostic mode to the bypass mode after a delay allowing the diagnostics routine to complete.

18 Claims, 4 Drawing Sheets

5,659,208

POWER SUPPLY WITH MULTIPLE ISOLATED REGULATORS AND ISOLATION MODE

BACKGROUND OF THE INVENTION

1. Technical Field

This invention relates to power supply circuits for computers or the like, and more particularly to power supply circuits using two or more separate redundant regulators (or other supplies such as batteries) to supply a common load, and having a means for isolating (shutting down) each of the regulators during a diagnostic mode of operation.

2. Description of the Related Art

Large computer systems are often provided with a back-up power source, so that in case of a failure of the main power source (usually AC line current), the computer can be operated long enough to save its state. When the power comes back up, the computer can be restarted without loss of data. During the time that the computer is down, it is common practice to maintain some parts of the system in a standby, power-down mode, so that contents of main memory, for example, are kept intact. To supply this standby power, usually batteries are employed, and in a large system the battery requirements are substantial. The main memory may be maintained at a current which is lower than the ordinary operating current, further reducing power requirements during this period. For example, DRAMs used for the main memory may be placed in a mode of lengthened clock and refresh periods. It is also desirable to have converters so that if one goes out the standby system is not totally defeated. When going into the standby mode, i.e., just after main AC power goes down, it is preferable to do a diagnostic routine to make sure the separate converters are operating properly, and if not then provision is made for individually shutting off the converters to prevent a faulty converter from disturbing the load. For this reason, the converter outputs are isolated from one another by diodes. Unfortunately, the diodes are still in the circuit after the diagnostic routine is completed, and the forward voltage drop represents a substantial power dissipation which is of course adverse to long battery life. At the low voltages involved, the forward drop of these diodes is a significant fraction of the total power usage in the battery-supplied standby or backup mode.

SUMMARY OF THE INVENTION

It is therefore one object of the present invention to provide an improved standby power supply arrangement for a computer system, particularly one in which redundant back-up supplies are provided.

It is another object of the present invention to provide an improved battery back-up system and method for a computer system, wherein the battery life is not unduly compromised by series-connected diodes which are needed to isolate the redundant supplies during testing.

The above as well as additional objects, features, and advantages of the present invention will become apparent in the following detailed written description.

According to one embodiment of the invention, a method of operating a redundant power supply is provided wherein two or more converters (or other power supply devices, such as batteries) are separately connected to a common output node through separate diodes to isolate the converters and allow the outputs to be separately tested for diagnostic purposes. The diodes are selectively bypassed by connecting drain-to-source paths of P-channel MOS field-effect transistors separately across the diodes. During the diagnostic mode of operation, a controller shuts off the MOS transistors, so the diodes are effective in isolating the converters. During the bypass mode of operation, the transistors are turned on by the controller so the diodes are bypassed and their forward voltage drop does not appear in the circuit and so power dissipation is reduced. It is noted that the P-channel MOS transistor is connected such that it's intrinsic PN-junction diode conducts in a forward direction in parallel with the isolation diode, so that isolation during the diagnostic mode is not cancelled. The controller switches from the diagnostic mode to the bypass mode after a delay allowing the diagnostics routine to complete.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
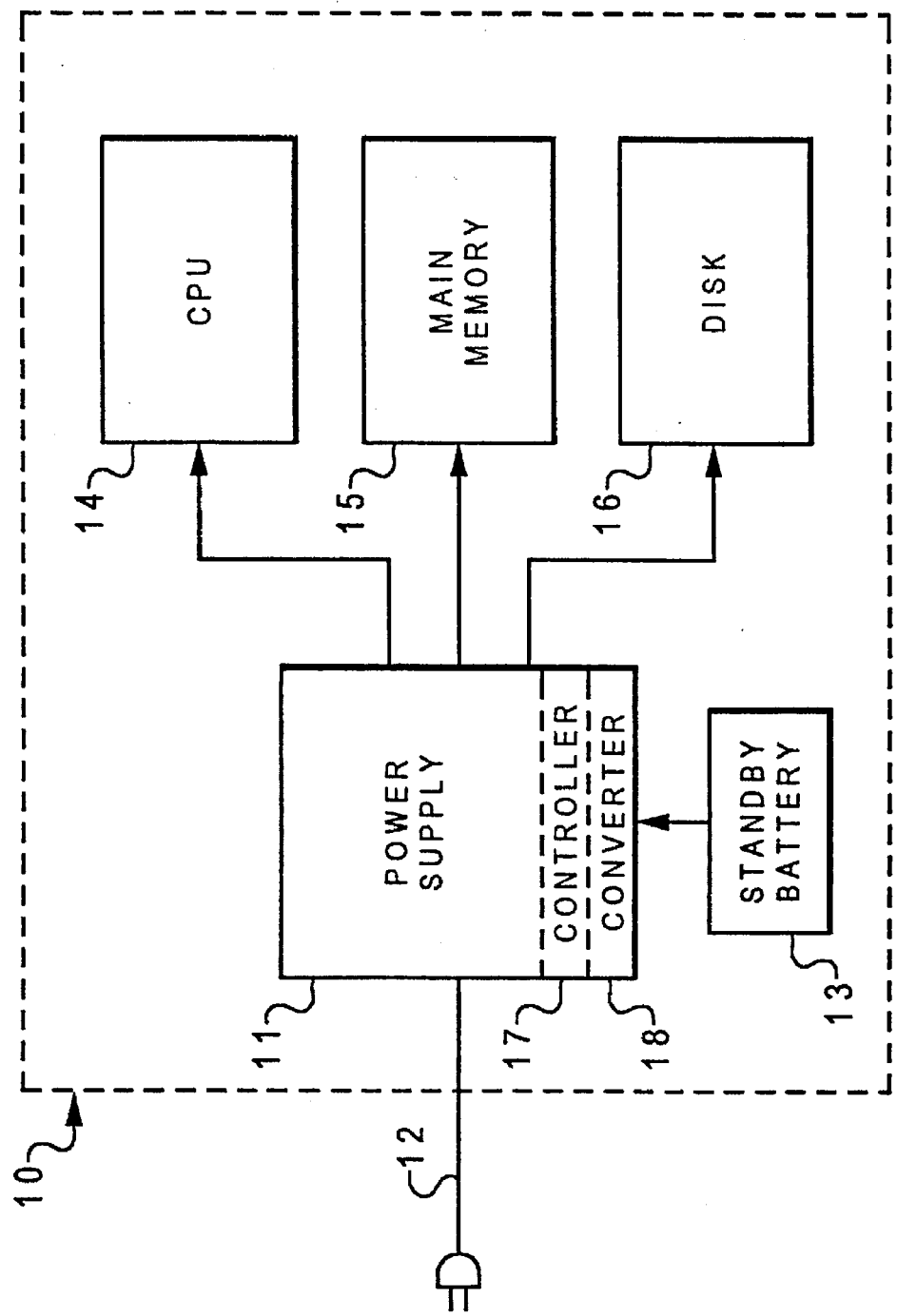
FIG. 1 is an electrical diagram in block form of a computer system which has a redundant back-up power supply using features of one embodiment of the present invention.

Referring to FIG. 1, a computer system 10 is shown having a power supply unit 11 which uses line power from AC line 12, as well as a battery backup 13, to provide operating voltages to a CPU 14, a main memory 15, and peripheral devices such as a disk drive 16. The main memory may be large, 1GB, for example, and is made up of DRAMs having a normal operating state and a power-saving state. During normal operation, the computer is powered from the AC line 12, with converters in the power supply 11 producing suitable operating voltages such as 3.5 V DC to the various components of the CPU 14, memory 15 and peripherals 16. The power supply unit 11 has a controller 17 which is programmed so that when the AC line power goes down, an orderly routine is executed, including (1) recognize that the AC power is down, (2) notify the CPU so that it may initiate a shut down process in the CPU to allow a recoverable state to be saved to permanent storage in disk 16, (3) apply full power (e.g., 3.5 V) to the entire CPU for a short time to allow an orderly shutdown, saving state, then (4) power down all computer components except the DRAMs in the main memory, which are placed in a minimum refresh mode. In this minimum refresh mode, the clock and refresh rate for the DRAMs are slowed down, and only a minimum operating voltage such as 3.5 V is applied to the DRAM chips, to conserve power. Thus, when AC power is restored, the operation of the computer can be recovered more rapidly than if the entire memory condition had to be regenerated, and also saving the memory condition avoids the time which would have been needed to write the entire contents to disk before shutdown.

Figure 2:
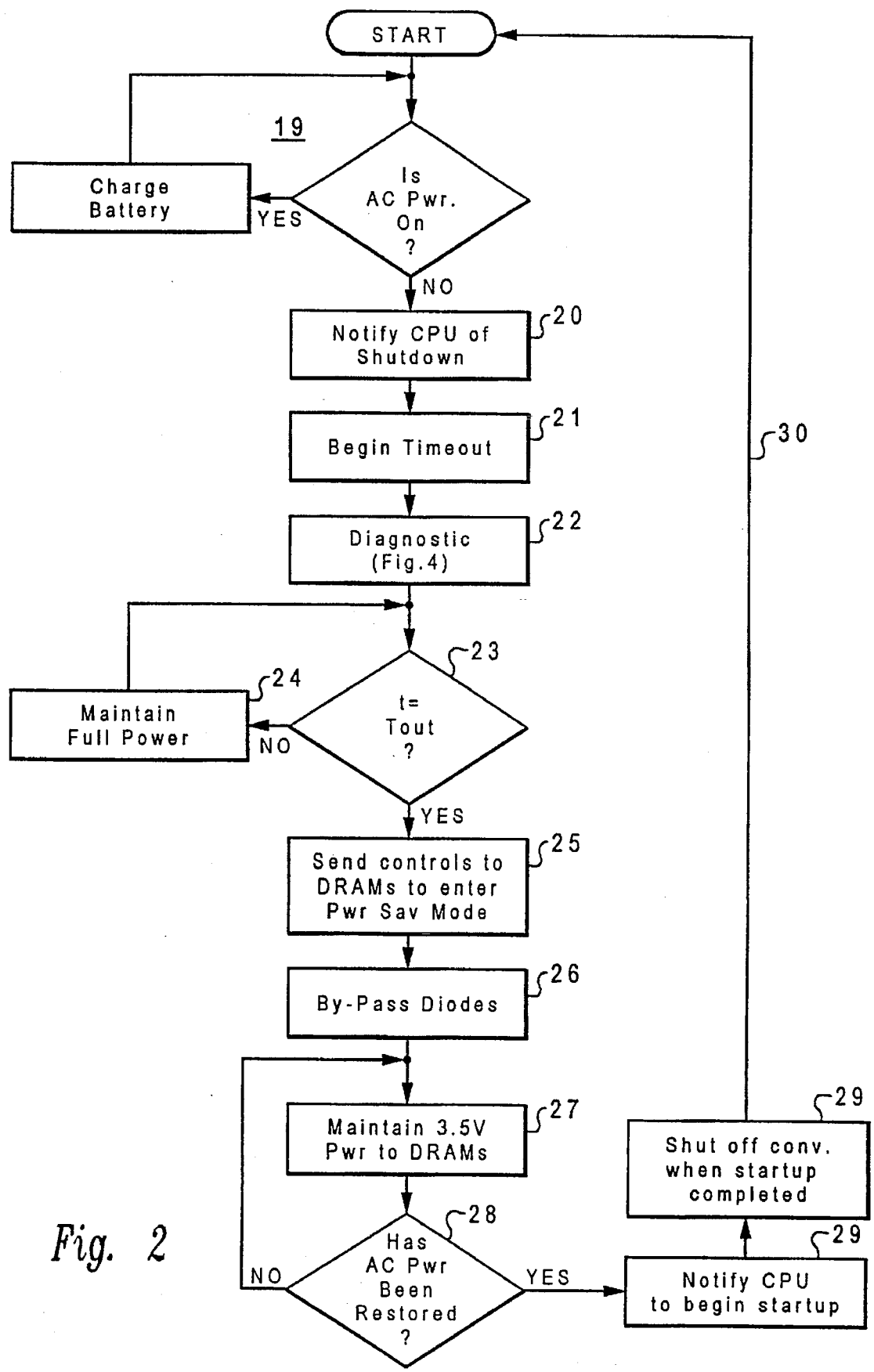
FIG. 2 is a logic flow chart of a process executed by a power supply controller in the system of FIG. 1 according to this embodiment of the invention.

Referring to FIG. 2, the process executed by the power supply controller 17 is illustrated in flow diagram form. The controller continuously checks to see if AC power is on, and if so, continues to charge the battery 13, as represented by the loop 19. If not, a message is sent to the CPU for it to start shutdown, at block 20. Then a time-out is begun at block 21, e.g., a minute, to define the time during which full power is maintained. Then, a diagnostic routine for the battery converters is entered, according to the invention, as seen at block 22. This routine checks to make sure that both or all of the redundant DC converters are operating properly to supply the low current maintenance level, and if not then each DC converter can be separately placed off-line so that one converter does not impair the function of the other. A decision block 23 checks to see if the selected time has expired, i.e., time-out, and if not full power is maintained at block 24 and the time-out loop continues. If so, the controller 17 sends controls to the DRAMs in main memory to enter the power-saving refresh mode, at block 25. Also, at this point, the controller sends signals to the DC converters to bypass the isolating diodes in the non-faulted units, as will be explained; this operation is represented by block 26 of FIG. 2. Thereafter, the DRAMs are maintained in the low power mode as represented by the block 27, until AC power is restored as detected in the loop 28 of the diagram. When AC power is restored, a message is sent to the CPU and the by-pass devices are turned off, at blocks 29, and the begin condition is reentered via path 30 of the diagram.

Figure 3:
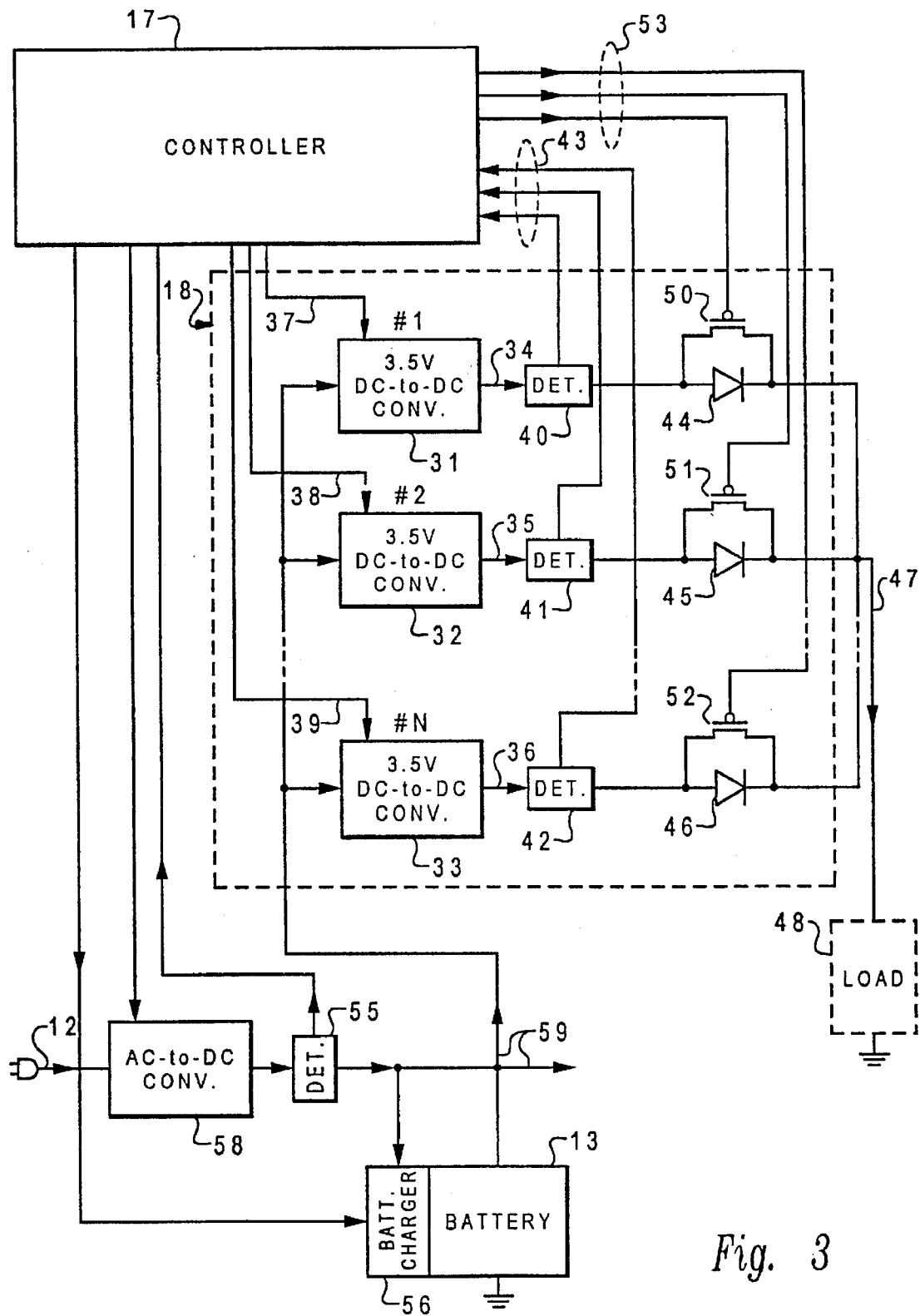
FIG. 3 is an electrical diagram in block form of detail of the redundant back-up power supply for the computer system of FIG. 1, using features of this embodiment of present invention.

Referring to FIG. 3, a more detailed diagram of the controller 17 and the converter unit 18 is shown, according to the invention. In this example, there are a plurality of DC-to-DC converters 31, 32, and 33, each receiving a DC input from the battery 13 (or from the AC-to-DC converter 56) and producing a DC output on nodes 34, 35, and 36, respectively. The converters 31, 32, and 33 can be separately turned on and off by the controller 17 via lines 37, 38, and 39, so that each may be placed online or taken offline. The controller can also separately detect certain operating conditions at the output of each controller, as represented by the detectors 40, 41, and 42, and these conditions are undervoltage, overvoltage, and overcurrent, any one of which would represent a condition whereby the converter should be shut down. Lines 43 feed this detected information back to the controller 17. The output nodes 34, 35, and 36, from the converters 31, 32, and 33, are connected through diodes 44, 45, and 46 to a common node 47 which is coupled to the load 48 (the DRAMs in memory 15). The diodes 44, 45, and 46 are needed to isolate the converter output nodes 34, 35, and 36 from one another. Otherwise, if one converter was down (for example), producing an undervoltage or no voltage, this would not be detected by the detector 40, 41, or 42 for this converter because the voltage from the other one or more converters would be coupled from the common node 47 back to the detector. Thus, the diodes 44, 45, and 46 permit the different converter outputs 34, 35, and 36 to be separately and independently sensed by the controller 17 via detectors 40, 41, and 42 and lines 43. The problem is that the diodes 44, 45, and 46 drop a significant voltage in their forward direction, compared to the load voltage of the load 47. For example, a Schottky diode or PN junction diode has a forward voltage drop of perhaps 0.5 V, which is a noticeable fraction of 3.5 V, so the power dissipation in the diodes may be a sizable percentage of the total dissipation. The main interest is battery life, so that the computer system 10 will be maintained in its shutdown state without losing the main memory contents until it can be brought back online with full power. Thus, it is the goal to reduce power dissipation as much as possible in the shutdown, minimum refresh mode.

According to an important feature of the invention, a bypass arrangement is provided to shunt the diodes 44, 45, and 46 after their function as isolating elements is completed. To this end, bypass devices in the form of P-channel MOS field-effect transistors 50, 51 and 52 are separately connected in parallel with the diodes 44, 45, and 46, and these MOS transistors have their gates connected to receive output from the controller 17 via lines 53. It is important that the P-channel MOS transistors 50, 51 and 52 be connected so that the parasitic PN-junction diode of the MOS transistors is poled for conduction in the same direction as the forward direction of the diode it bypasses. That is, the P-type drain region of the P-channel MOS transistor is connected to the battery side, at node 34, etc., and acts as the "anode" side, while the source region acts as the "cathode" and is connected to the cathode or load side of the corresponding diode 44, etc. The forward voltage drop across the drain-to-source path of the P-channel MOS transistor is lower than the forward drop of a diode, when the P-channel MOS transistor is biased by a gate voltage substantially above turn-on, and so the power dissipation is greatly reduced. It should be noted that if the detectors 40, 41 and 42 detect a fault, the controller 17 will keep the respective p-channel MOS transistor 50, 51, or 52 of with the control line 53.

In FIG. 3, it is seen that the controller 17 is able to sense the output of the AC input 12 at a detector 55 at an output of an AC-to-DC converter 56, and to turn this converter 56 on and off. The output of this converter 56 is used to charge the batteries 13 via a charger 56, and also supplies the main voltage at node 59 (e.g., 32 V) which is the main bus voltage of the computer system 10.

Figure 4:
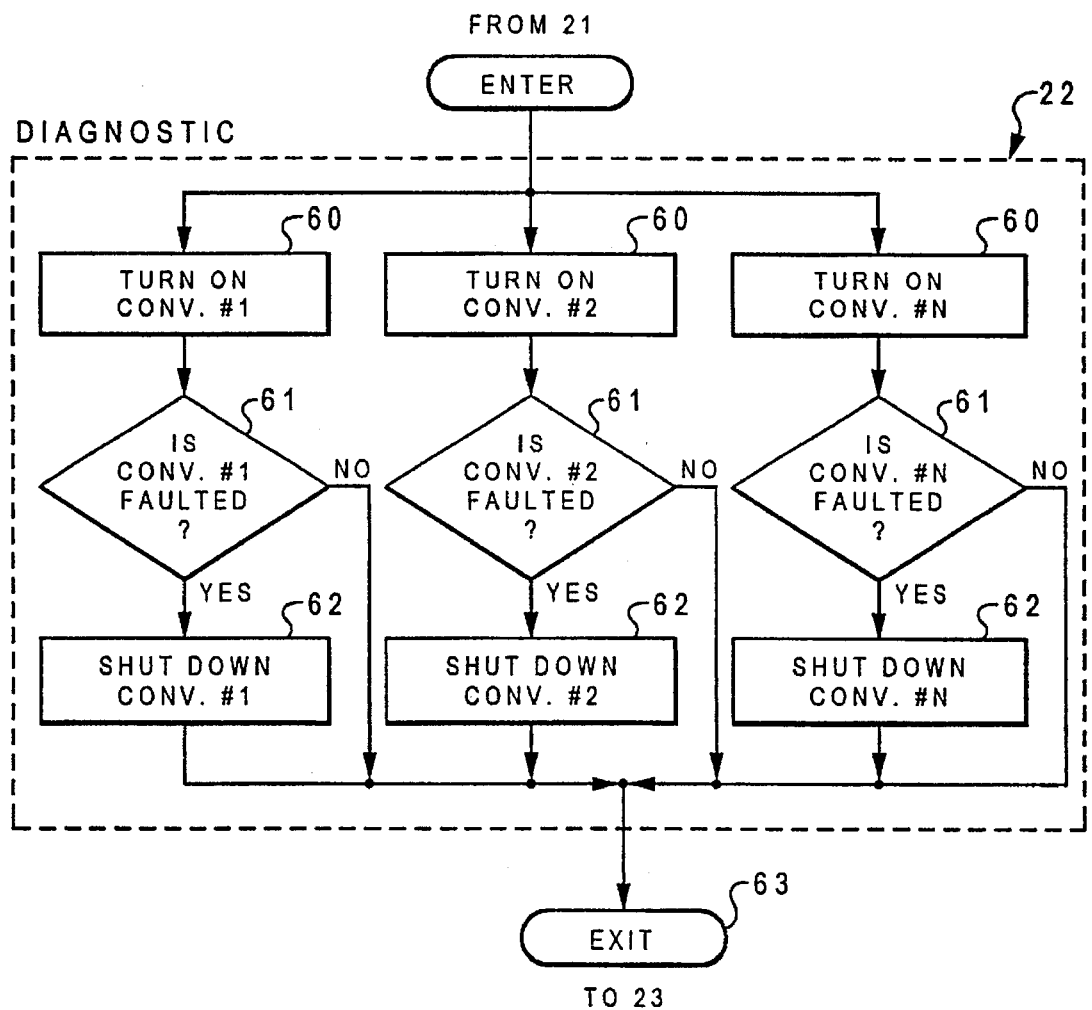
FIG. 4 is a logic flow chart of details of the process of FIG. 2 executed by the power supply controller in the system of FIG. 1, according to the invention.

Referring to FIG. 4, the diagnostic and control process 22 executed by the controller 17 for the DC-to-DC converters of FIG. 3 is illustrated according to one embodiment. The first step is to turn on each one of the converters, represented by the blocks 60, and then each one of the converter outputs 34, 35, and 36 is individually tested to see if an undervoltage condition exists, as illustrated by the decision blocks 61. If so, the respective converter 31, 32, or 33 is shut down, blocks 62, and control does to exit point 63. If not, then the process is exited at point 63 in each case.

In a modification of the above-described embodiment of the invention, N-channel MOS transistors would be used in place of the P-channel transistors 50, 51, and 52. Also, NPN or PNP bipolar transistors could be used, or relays or other bypass devices. In addition, it is possible to use the intrinsic body diodes in the bypass devices in place of the discrete diodes 44, 45, and 46.

The invention is not limited to a system where like power sources are used as described above with reference to the preferred embodiment. For example, a power supply system may be used wherein the output of a power regulator is directly backed up with a battery, instead of another regulator. Here the blocking diode, bypass element, and control method, as described above, could still be used to bypass the blocking diode for the batteries to improve the efficiency of the battery.

Accordingly, while the invention has been particularly shown and described with reference to a preferred embodiment, it will be understood by those skilled in the art that various modifications of the disclosed embodiment, as well as other embodiments of the invention, and various changes in form and detail, may be made therein without departing from the spirit and scope of the invention.

What is claimed is:

1. A power supply circuit, comprising:
   a) first and second power sources connected separately to a common output node through first and second unidirectional means, respectively;
   b) first and second by-pass devices included in said unidirectional means, respectively;
   c) means for controlling said first and second by-pass devices to provide a diagnostic mode of operation and a bypass mode of operation, during said diagnostic mode of operation said by-pass devices being nonconductive, and during said bypass mode of operation said first and second by-pass devices being conductive.

2. A power supply according to claim 1 wherein said unidirectional means include diodes and said by-pass devices are MOS transistors having drain-to-source paths connected separately across said diodes.

3. A power supply according to claim 2 wherein said power sources are DC-to-DC converters.

4. A power supply circuit according to claim 3, wherein said first and second unidirectional means are each connected for conduction in a forward direction from said first and second converters, respectively, to said common supply node.

5. A power supply circuit according to claim 4, wherein said first and second MOS transistors each have intrinsic PN junctions connected for conduction in said forward direction from said first and second converters, respectively, to said common supply node.

6. A power supply circuit according to claim 1, wherein said unidirectional means include first and second MOS transistors each have intrinsic PN junctions connected for conduction in a forward direction from said first and second power sources, respectively, and function as diodes.

7. A power supply circuit according to claim 1, wherein said by-pass devices are circuit elements selected from the group consisting of P-channel MOS transistors, N-channel MOS transistors, NPN bipolar transistors, PNP bipolar transistors, and relays.

8. A power supply circuit according to claim 1, wherein said means for controlling switches from said diagnostic mode of operation to said standard mode of operation after a selected delay from beginning said diagnostic mode of operation.

9. A method of operating a power supply, comprising the steps of:
   a) connecting a first and a second converter separately to a common output node through a first and a second diode, respectively;
   b) connecting a drain-to-source path of a first and a second MOS transistor separately across said first and said second diodes, respectively;
   c) during a diagnostic mode of operation, controlling said first and said second MOS transistors to be nonconductive in said drain-to-source paths; and
   d) during a bypass mode of operation, controlling said first and said second MOS transistors to be conductive in said drain-to-source paths.

10. A method of operating a power supply according to claim 9, wherein said first and second diodes are each connected for conduction in a forward direction from said first and second converters, respectively, to said common supply node.

11. A method of operating a power supply according to claim 10, wherein said first and second MOS transistors each have PN junctions connected for conduction in said forward direction from said first and second converters, respectively, to said common supply node.

12. A method of operating a power supply according to claim 9, wherein said MOS transistors are P-channel transistors.

13. A method of operating a power supply according to claim 9, wherein said steps of controlling include switching from said diagnostic mode of operation to said standard mode of operation after a selected delay from beginning of said diagnostic mode of operation.

14. A power supply circuit, comprising:
   a) a plurality of converters respectively connected separately through separate diodes to a common supply node;
   b) a plurality of transistors, each having a drain-to-source path connected separately across one of said separate diodes;
   c) means for controlling said plurality of transistors separately to provide a diagnostic mode of operation and a bypass mode of operation, during said diagnostic mode of operation said transistors being nonconductive in said drain-to-source paths, and during said bypass mode of operation said plurality of transistors being conductive in said drain-to-source paths.

15. A power supply circuit according to claim 14, wherein said separate diodes are each connected for conduction in a forward direction from said converters to said common supply node.

16. A power supply circuit according to claim 15, wherein said transistors each have PN junctions connected for conduction in a reverse direction from said converters, respectively, to said common supply node.

17. A power supply circuit according to claim 16, wherein said transistors are P-channel field-effect transistors.

18. A power supply circuit according to claim 17, wherein said means for controlling switches from said diagnostic mode of operation to said standard mode of operation after a selected delay from beginning said diagnostic mode of operation.

* * * * *